Oct. 3, 1939.  J. J. PALOTCE  2,174,945
BEARING HONE
Filed March 16, 1939
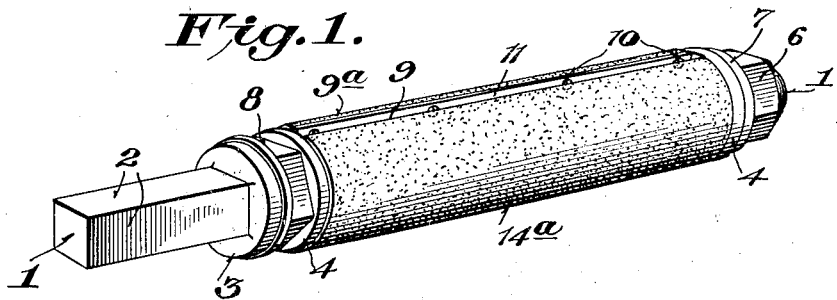
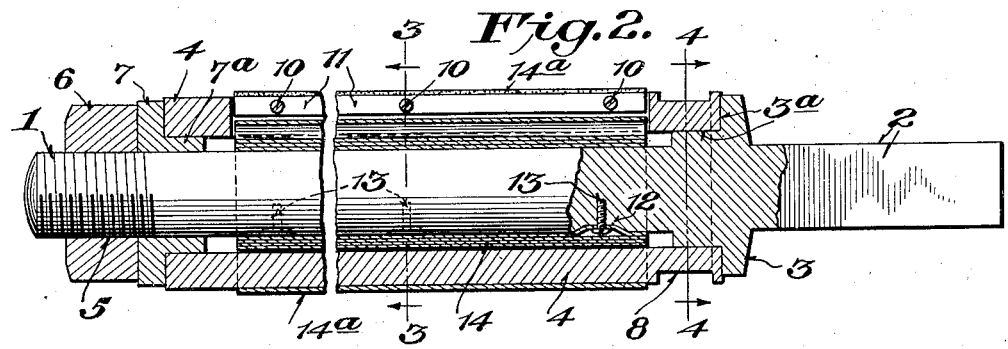
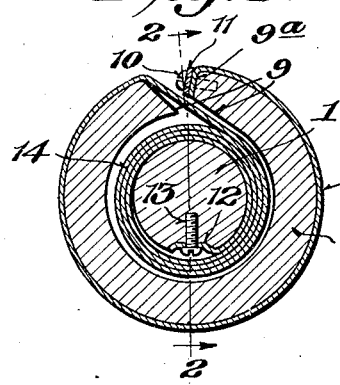
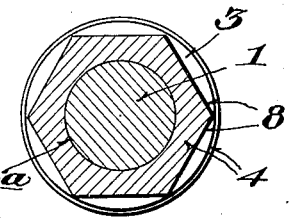
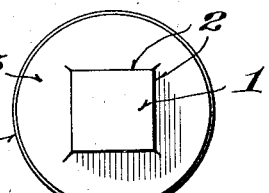
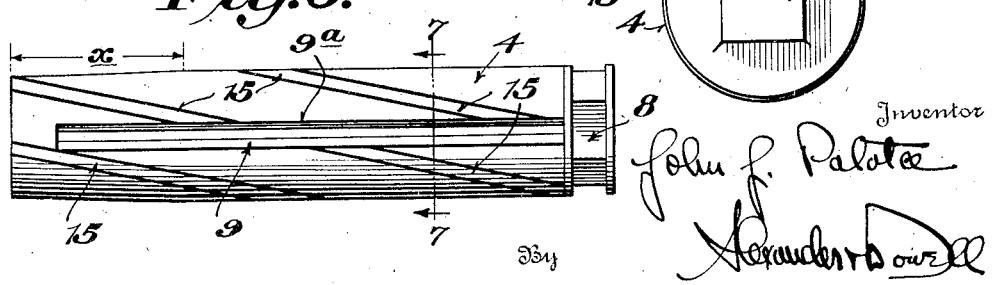
Inventor
John J. Palotce
By Alexander Dowell
Attorneys Patented Oct. 3, 1939

2,174,945

UNITED STATES PATENT OFFICE 2,174,945

BEARING HONE

John J. Palotce, Youngstown, Ohio

Application March 16, 1939, Serial No. 262,257

5 Claims. (Cl. 51—194)

This invention is a novel improvement in abrasive hones, and the principal object thereof is to provide a simple, novel and efficient hone consisting of an elongated pilot shaft having an elongated grinding sleeve mounted in bearings thereon in spaced relation, said sleeve having a longitudinally disposed slot therein, a roll of flexible abrasive material being fixedly mounted on the shaft within the sleeve with its outer convolution extending through the slot in the sleeve and passing around the grind sleeve, the outer end thereof being removably secured to a wall of the slot, means being also provided for permitting relative rotation of the sleeve and shaft to draw the abrasive material taut around the sleeve, or to permit a fresh length of the material to be withdrawn from the roll through the slot when desired and secured around the sleeve.

Another object of the invention is to provide an elongated cylindrical hone of relatively small diameter possessing certain novel features of construction, hereinafter set forth, whereby the hone, wet or dry, is particularly adapted to be inserted into bearings for use in grinding, machining, or boring bearings, of relatively small diameter, such as crank-shaft bearings, connecting-rod bearings, wrist pin bearings, main bearings, or the like; or the hone may be used for many other purposes. The present shell-type bearings used in motors and engines are usually pressed-out, instead of being ground or reamed, and such pressing operations have not been found entirely satisfactory since it is practically impossible to obtain a perfect fit by such method. My novel hone is particularly adapted for use in motor plants, and for use in service and repair garages, to align the bearings and provide a perfect wearing surface whereby the life of the bearing will be greatly increased above the normal life of bearings aligned by the usual pressing-out method now in common use.

A further object is to provide an elongated cylindrical hone of relatively small diameter having a slight taper at its outer end to facilitate entry of the hone into the bearing to be ground or bored; also to provide on the surface of the cylinder a plurality of spiral grooves or flattened portions, each making approximately one-half a convolution throughout the length of the cylinder, to provide spaces wherein the cuttings or grindings may accumulate and pass off to one side, which cuttings might otherwise build-up or increase the effective diameter of the hone, throwing same off-center.

I will explain the invention with reference to the accompanying drawing which illustrates one practical embodiment thereof to enable others to adopt and use the same; and will summarize in the claims, the novel features of construction, and novel combinations of parts, for which protection is desired.

In said drawing—

Fig. 1 is a perspective view of the hone assembly.

Fig. 2 is a longitudinal section therethrough on the line 2—2, Fig. 3.

Fig. 3 is a transverse section on the line 3—3, Fig. 2.

Fig. 4 is a section on the line 4—4, Fig. 2.

Fig. 5 is an end elevation of the inner end of the hone.

Fig. 6 is a plan view of the grinding sleeve, detached.

Fig. 7 is a transverse section on the line 7—7, Fig. 6.

As shown, the hone assembly comprises an elongated pilot shaft 1 having one end 2 reduced and machined to square or polygonal cross-section. On shaft 1 adjacent portion 2 is an external annular flange 3 having its outer face and edge reduced as at 3a to form a bearing for the inner end of a grinding sleeve 4, said bearing 3a being of greater diameter than the major cylindrical portion of shaft 1. The outer end of the shaft 1 is threaded as at 5 to receive a nut 6 for the purpose hereinafter described.

Grinding sleeve 4 is maintained upon shaft 1 by means of a thrust washer 7, the bore of which makes a sliding fit upon the shaft, said washer 7 having a hub extension 7a (Fig. 2) of external diameter corresponding with that of the bearing 3a of the shaft, said extension being adapted to enter the outer end of sleeve 4 and to form the outer bearing for said sleeve whereby same is journaled in spaced relation with respect to shaft 1 throughout the major portion of its length. Washer 7 is interposed between the outer end of sleeve 4 and the nut 6, as indicated in Fig. 2, whereby when nut 6 is tightened the sleeve will be frictionally locked against rotation on said shaft. The end of the sleeve 2 adjacent the shoulder 3 is machined into hexagonal or polygonal cross-section as indicated at 8 in Figs. 4 and 6 whereby the sleeve may be readily rotated on shaft 1, when nut 6 is loosened.

In grinding sleeve 4 extending axially thereof, is a slot 9 (Fig. 3) terminating adjacent the ends of the sleeve. The walls of slot 9 are disposed substantially tangentially of shaft 1 as indicated in Fig. 3, but one wall of the slot adjacent the periphery of the sleeve is formed, as at 9a, substantially radially of the shaft 1, or substantially normal to the plane of the slot, and the outer ends of both walls of the slot are rounded as shown in Fig. 3 into the outer surface of the sleeve, at opposite sides of the slot. In the wall 9a of the slot are a series of aligned tapped bores receiving screws 10 which secure a clamp strip 11 along said wall.

On shaft 1, within the annular chamber formed between shaft 1 and sleeve 4, are a series of aligned depressions 12 registering with tapped radial bores receiving screws 13, the depressions 12 being preferably of somewhat greater depth than the heads of screws 13, as indicated in Figs. 2 and 3. A roll 14 of abrasive material, such as emery cloth, preferably water- and oilproof emery cloth, of width substantially equal to the length of slot 9 in sleeve 4, is wrapped in convolutions around shaft 1, as shown, with its inner end secured to the shaft by the screws 13. The outermost convolution 14a of the abrasive roll 14 is then extended through the tangential slot 9, and further passed around the periphery of the sleeve 4, and its outer end is then inserted between the clamp strip 11 and the wall 9a of slot 9, and screws 10 tightened. The squared end 2 of shaft 1 is then held in a vise or other device, and a suitable wrench then engaged with the hexagonal portion 8 of sleeve 4, the nut 6 being loosened, and sleeve 4 is then rotated on shaft 1 in a direction to tighten the abrasive material 14a around the periphery of sleeve 4. When this is done, nut 6 is again tightened against thrust washer 7, whereby the sleeve will be frictionally held against rotation relative to the shaft.

As shown in Fig. 6, the sleeve 4 is preferably slightly tapered at its outer end throughout the portion denoted by the line $x$ (Fig. 6) so that the reduced diameter will facilitate entry of the hone into the bearing to be ground or bored. Also the surface of sleeve 4 is preferably but not necessarily provided with a plurality of spiral grooves or flattened portions 15 (five such spiral portions being indicated in Fig. 7), each making approximately one-half a convolution throughout the length of sleeve 4, same providing recesses above the abrasive sheet 14a to permit accumulations of cuttings and grindings to pass off to one side, which cuttings might otherwise build up the effective diameter of the hone and throw same off-center. The surface of the spiral portions 15 may be either flat, as shown in Fig. 7, or may be somewhat concave.

The hone, above described, may be used for grinding, machining, or boring bearings of small diameter, such as crankshaft or main connecting-rod or wrist pin bearings, or the like. When the abrasive material or emery cloth 14a on the surface of sleeve 4 has been sufficiently worn, nut 6 on shaft 1 may be loosened, and screws 10 of clamp strip 11 loosened, and a length of the emery cloth unwound from shaft 1 sufficiently to provide a fresh portion extending around the surface of the sleeve 4, whereupon the worn portion may be cut off, and the outer end of the fresh portion inserted under the clamp strip 11 and secured by screws 10; whereupon sleeve 4 may again be rotated with respect to shaft 1 so as to tighten the emery cloth around the sleeve, and the nut 6 tightened to frictionally lock the sleeve and shaft together. The above construction is simple, and provides a hone in which fresh portions of emery cloth from the roll 14 may be quickly and readily secured around the surface of the sleeve 4 whenever desired.

Sleeves 4 of various diameters may be used on the same shaft 1, provided they each have internal diameters to suit the bearings 3a, 7a; and thus the same shaft may be used in connection with a series of sleeves to provide hones of various diameters. Moreover, various thicknesses of emery cloth will provide slight differences in the effective diameter of the hone.

I do not limit my invention to the exact form shown in the drawing, for obviously changes may be made therein within the scope of the claims.

I claim:

1. A hone of the character specified, comprising an elongated shaft having an external flange forming a bearing; a thrust washer slidably mounted on said shaft and having a hub extension forming an opposed bearing; an elongated sleeve journaled on said bearings and having a longitudinal slot; a roll of abrasive material fixedly mounted upon said shaft within the sleeve and having its outer convolution extending through the slot and around the sleeve with its outer end secured in said slot; and means for locking the sleeve against rotation on said shaft.

2. In a hone as set forth in claim 1, said shaft having a non-cylindrical portion, and said sleeve having a non-cylindrical portion, whereby the sleeve may be rotated relatively to the shaft.

3. In a hone as set forth in claim 1, said sleeve having a slight taper at its outer end.

4. In a hone as set forth in claim 1, said sleeve having spiral grooves each making approximately one-half a convolution and extending the length of the sleeve.

5. A cylindrical support for flexible abrasive material comprising an elongated shaft; an elongated sleeve journaled on said shaft in spaced relation thereto and having a slot; a clamp strip removably mounted on one wall of the slot; means for securing a roll of flexible abrasive material to said shaft within the sleeve; means for locking the sleeve against rotation on said shaft; said sleeve having spiral grooves each making approximately one-half a convolution and extending the length of the sleeve.

JOHN J. PALOTCE.